United States Patent

[11] 3,578,297

[72] Inventor Lee H. Niems
 2702 Brassie, Flossmoor, Ill. 60422
[21] Appl. No. 835,696
[22] Filed June 23, 1969
[45] Patented May 11, 1971

[54] APPARATUS FOR COOLING PARTICLES
 16 Claims, 2 Drawing Figs.
[52] U.S. Cl. .................................................. 263/32, 34/169
[51] Int. Cl. ........................................................ F27b 7/02
[50] Field of Search .......................................... 263/32, 29; 34/169

[56] References Cited
UNITED STATES PATENTS
2,970,828 2/1961 Niems .......................... 263/32

Primary Examiner—John J. Camby
Attorney—Charles F. Schroeder

ABSTRACT: Apparatus for cooling heated pieces of matter and particularly calcined lime pebbles or particles, wherein cool air is injected under positive pressure into the path of and counter to the downwardly moving mass of pebbles with a coincident partial downward flow of air which is automatically balanced and prevented from blowing free particles of dust from the mass into the surrounding atmosphere by sucking the downward flowing air and coincident dust particles into a negative pressure recirculating path also generated by the positive pressure means.

This invention is directed to a method and apparatus for air cooling high temperature masses of particles continuously discharged from pyroprocessing apparatus here exemplified by calcined lime pebbles such as are produced from a limestone calcining operation in a kiln. The invention is not limited to cooling of lime pebbles alone, however, since it may be applied to cooling other heated pieces of matter such as deadburned dolomite, cement, expanded shale and the like. The term particles are used herein refers to the many forms of such materials including large and small pieces, pebbles, granules, broke solids, fragments, clinkers etc. In this regard, lime particles cooled in the apparatus herein described may, for example, range in size from dust less than 60 mesh to 1 inch to 2 1/2 inch pebbles or larger.

Patented May 11, 1971

3,578,297

INVENTOR.
LEE H. NIEMS
BY
Charles F. Schroeder
ATTORNEY

APPARATUS FOR COOLING PARTICLES

BACKGROUND OF THE INVENTION

Calcining of lime is typically accomplished in a high temperature kiln-type furnace such as a generally horizontal rotary kiln heated by one or more burners in rotary hearth-type furnaces, and other types of kilns, including those of the shaft type. It is customary to subject the material being processed to flame temperatures up to 2800° F. to modify the physical and chemical properties of the limestone charge. The hot lime exiting from the calcining zone is then deposited on top of a generally vertical cooling bed through which cooling air is passed in counterflow to reduce the temperature of the lime to a level that permits subsequent conveying, storage and shipment within a reasonable space and a reasonably short time period. Only in the shaft kiln is the cooling bed an integral part of the kiln. This invention relates most often to kilns other than shaft kilns, but may also be applied to a forced draft type of shaft kiln.

1. Field of the Invention

The mass of heated pieces of lime of such a cooling bed is contained in a hopper system in which the mass moves gradually and continuously downwardly under the influence of gravity at a rate determined by the rate of removal of the lime from the base of the hoppers. The lime is received directly and continuously from the kiln and as it moves downwardly in the bed is inventoried for a period typically in the order of from three-fourths to to 1½ hours to provide the necessary time for heat transfer from the lime to the air. The cooling air is introduced into the downwardly moving mass of particles at an intermediate region between the top and discharge of the cooler to effect counterflow cooling without excessive pressure drop.

To promote maximum efficiency in the overall system incorporating the kiln and the cooling unit, the heat abstracted from the lime by the cooling air is returned to the combustion process as preheated air for combustion and, where applicable, to the drying of fuel for the combustion process.

2. Prior Art

Coolers presently in use of the crossflow type do not lend themselves to maximum heat recuperation because it is not possible to utilize all the heated air resulting from cooling since more air must be used to effectively cool than can be utilized for combustion and drying. Accordingly, much of the heat from such coolers is wasted by venting it to the outer atmosphere through stacks. While coolers of the counterflow type are more efficient, they nonetheless discharge some lime at temperatures higher than desired with consequent problems in handling the hot lime and with a loss of efficiency of heat recuperation, so the lime discharged at relatively high temperatures still possesses appreciable amounts of sensible heat.

Difficulties with such arrangements arises in striving to obtain maximum use of the heat abstracted from the lime by returning it to the combustion process. Since only that amount of cooling air can be blown into the cooler which can be reused for combustion, it is important that airflow be balanced as nearly as possible with movement of lime. That is, each increment of the mass of lime passing through the cooler should be contacted by its proportionate share of cooling air.

Another difficulty encountered in coolers of this type is the problem of discharging the lime from the base of the bed in the cooler without causing blowout of air and dust to the atmosphere with consequent dusty conditions in the vicinity of the cooler discharge which would be intolerable to personnel in this area. This has been handled in some instances in the prior art by use of a small auxiliary fan to pick up air lost down through standpipes at the cooler discharge end and to reintroduce this air into the bed of the cooler in the upper central hottest region of the lime. This arrangement has the disadvantage of requiring excessive maintenance due to particle wear of the small fan and the thermal distress and warping of the dust conveying conduit system exiting into the hottest region of the bed, and it must of necessity exit in the hot upper section of the lime bed so as not to exceed the pressure capabilities of this small auxiliary fan. If fan speeds or type were chosen to provide higher pressures, the system maintenance would be further worsened by accelerated wear at higher fan wheel tip speeds. Another adverse feature of this upper bed air exit location is that this air only contacts that portion of the bed above the air exit, which is typically only 50° or less of the air travel path of the main flow of air, and thus this air cannot be used as effectively as the main flow of air since it does not contact as much of the lime bed in either space or time. This lowers the heat recuperative potential of the cooler in both theory and practice.

SUMMARY OF THE INVENTION

In view of the foregoing it is an object of the present invention to provide an air cooler for heated particles which is so highly efficient that only that amount of cooling air need by used which can be completely utilized in the kiln combustion process.

Another object of the invention is to provide such a cooler in which the main blower fan providing the cooling air is utilized to prevent blowout of dust particles as well as to provide a balanced recirculation air circuit adapted to the continuous matching of the counterflow cooling air ultimately used in the combustion process in the kiln.

Still another object of the invention is to provide a balanced recirculation air circuit for such coolers automatically matched to increases and decreases in the main flow of cooler air, while at the same time providing the desired degree of cooling. Such changes to the main flow of air would be made to correspond to changes in kiln production and combustion requirements.

Still another objective is to provide a substantial secondary cooling effect in the lower region of such coolers not accomplished heretofore.

In brief, these objectives are attained according to the present invention by providing an arrangement wherein the blower fan supplying air to an intermediate region of the bed of particles in the cooler is also utilized to withdraw air and dust particles moving downward to the base or discharge end of the hopper system. This air and dust, which contains sensible heat from the secondary cooling function is reintroduced back into the mainstream of cooling air. Use of the main fan to withdraw the air from the base of the bed in this manner also provides, with less equipment, greater blower capacity and less wear of parts to effect the desired collection of dust particles otherwise blown out into the surrounding vicinity.

The balance between changes in downward flowing air and the amount of negative pressure or suction available at the hopper discharge to cause this air to flow back to the main fan is made inherently self-regulating by connecting the duct transporting this air to an inlet just after the main inlet to the fan which is a metering orifice providing both a means to meter and control the flow of air and at the same time establishing a negative pressure or suction varying as a function of the total amount of air blown into the cooler. As the operator sets his control of the fan damper to call for more or less airflow to meet a change in production and/or fuel consumption, the amount of air caused to flow downwardly out the cooler discharge will show a directly related increase or decrease; and the suction established at the discharge will also change in amount directly as required to reintroduce the new amount of air back into the cooler fan. More specifically, the amount of air flowing upwardly and downwardly in the cooler for a particular lime size gradation and bed height, varies as a constant times approximately the square root of the blowing pressure. The negative pressure or suction at the fan inlet orifice, as determined by changing the setting of the main fan damper, varies as the square of the flow required, and this is exactly the change in suction required to entrain the changed flow of air from the cooler discharge. This suction thus is varied directly in matched relation with the requirement to reintroduce the escaping air from the cooler back into the main fan circuit. The circuit thus remains automatically in adjustment for any flow condition in contrast to previously used systems wherein adjustments are necessary whenever a change is made in the amount of main airflow.

Features of the invention lie in accomplishment of a balance of flow of air through the lime for cooling in matched relation to the combustion requirements, as well as an inherently balanced control and reintroduction of downward flowing air.

Other features lie in the reduction in equipment requirements, less wear of equipment utilized, and the elimination of previously used components exposed to high temperatures, with consequent reduction in maintenance requirements.

Other objects and features which are believed to be characteristic of my invention are set forth with particularity in the appended claims. My invention, however, both in organization and manner of construction, together with further objects and features thereof, may be best understood with reference to the following description taken in connection with the accompanying drawings, in which:

Figures 1, 2:
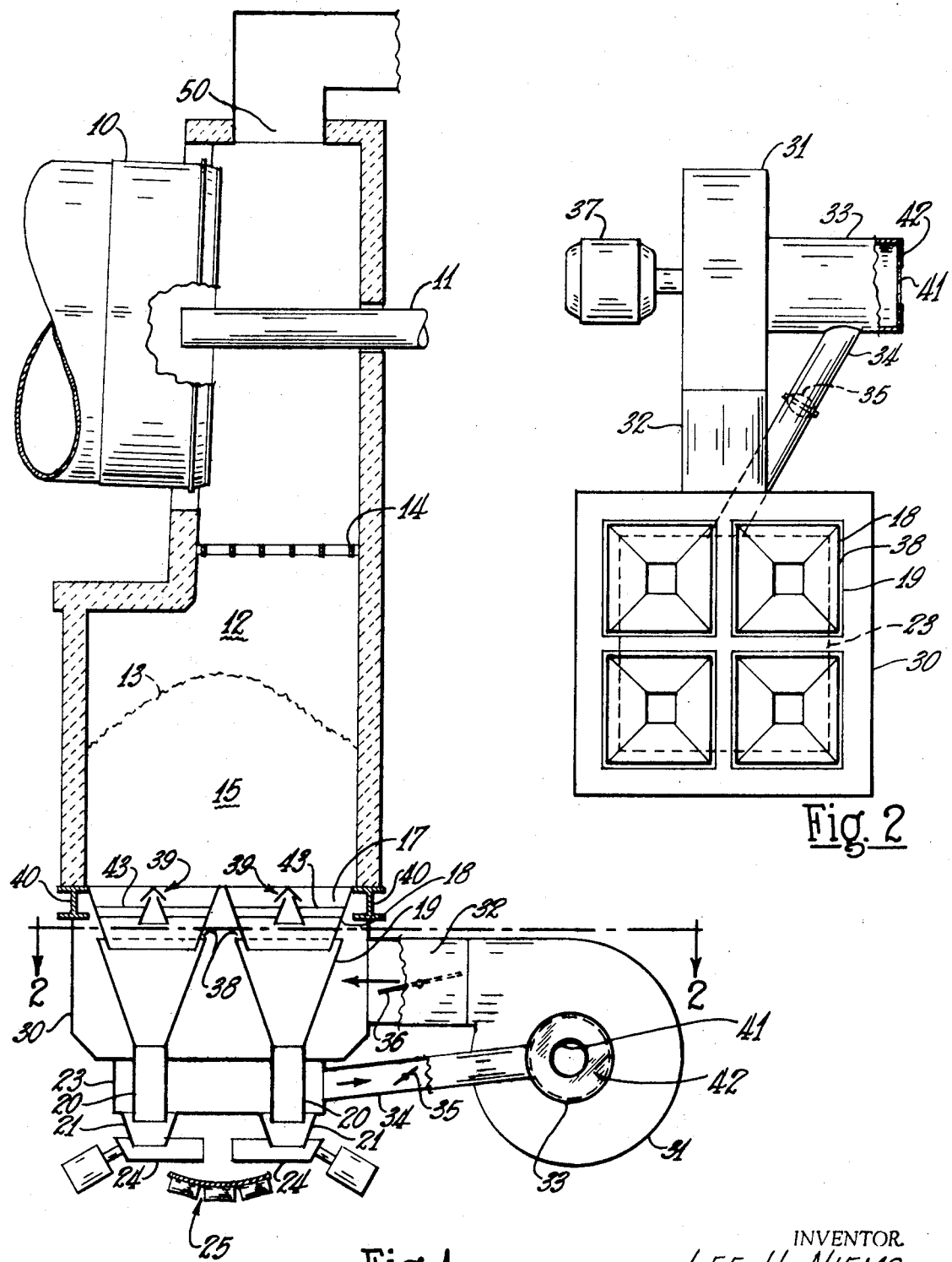
FIG. 1 is a view in elevation and partly in cross section of a cooler embodying the improvements of the present invention.
FIG. 2 is a cross-sectional plan view of the cooler taken on line 2–2 of FIG. 1.

Referring to the drawings in greater detail, FIG. 1 shows a general arrangement of components of a cooler at the end of an inclined rotary kiln 10 in which limestone or other matter has been calcined or otherwise heat treated. Burner 11 is representative of one or more burners located at the discharge end of the kiln 10 to supply heat required for calcination or other heat treatment of the charge.

The kiln 10 is inclined downwardly relative to the horizontal so that it discharges its contents by gravity into a cooling chamber 12 supported upon a footing of beams 40. Prior to deposition of the kiln product in the cooling bed 13 it is passed through an apertured grate 14 which separates large pieces of kiln coating or masses of lime or clinkers fused together, or foreign matter, from the product of acceptable size for treatment in the cooler. Material passing through the grate 14 settles by gravity into a cooling space 15. The material in the bed 13 moves generally downwardly and continuously into a plurality of louvered hoppers 17 located in spaced relation about the center of the bed. With such an arrangement of a plurality of hoppers rather than a single hopper below the bed, better control of the balance between material and airflow can be effected.

Admission of air to the intermediate region of the bed is accomplished by making each of the hoppers 17 of two interassociated flared sections 18 and 19 with a gap or louver 38 between. The upper flared section 18 has its lower region projecting down into the top of the lower section 19, but spaced from section 19 to form the louver 38. The material passing through the flared section 18 is thus received by what might, in a sense, be considered the main funnel section 19. The material leaving each main funnel section 19 passes into a lower connected standpipe 20 of greater than usual cross section as hereinafter further described but of relatively long length compared to its cross-sectional dimensions. EAch of the hopper standpipes 20 discharges into a separate short hopper 21, with the end of the standpipe being spaced from the top of its respective hopper 21 to allow bleedoff of air into a hood 23 surrounding the ends of all the standpipes 20. The hoppers 21, in turn, discharge the material passed therethrough onto an electrovibrating feeding mechanism generally indicated as a numeral 24 and ultimately to a conveyor belt 25.

Cooling of the material flowing through the hoppers 17 is accomplished by supplying air through the louvers 38 from a surrounding plenum 30 connected by a duct 32 to a fan 31. Air is drawn by the fan 31 from a main inlet 33 open to the atmosphere by way of a metering orifice 41 in an orifice plate 42. Air is also supplied to the main inlet 33 conduit by way of a conduit 34 connected to the hood 23 at the discharge ends of the hoppers 17. A damper 35 in the conduit 34 regulates the amount of air drawn by the fan 31 from the hood 23, but once set for a given material and bed height, it is inherently self balancing.

The cooling air passing upwardly passes through the bed whereupon a portion may be passed upwardly through an exhaust duct 50 leading to a coal pulverizing mill where it may be employed in drying the powered coal prior to injection of the fuel into the burners, or used to supply high temperature primary air for either gas or oil firing, but a major portion of the air passes directly to the kiln where it is employed as preheated air for combustion.

Now having generally described the arrangement of components of the apparatus of the cooler, the present invention, can be understood more clearly by pointing out that the material of the bed is received continuously from the kiln 10 and settles in the bed 13 for a period dependent upon the rate of receipt of the discharge particles from the kiln and the size of the bed as well as the rate of discharge of material from vibrating feeders 24. For a given rate of feed of material from the kiln and a given rate of removal of material from the discharge end of the hoppers, the period of residence of material in the cooling chamber 12 is dependent upon the volume of the mass of the bed 13. The rate of cooling of the particles thus becomes dependent upon the size of the bed 13 and the volume, temperature and rate at which air is passed through the bed by the fan 31. The fan under control and regulation of suitable electrical or pneumatic controls takes air in from the atmosphere as determined and regulated by a damper 36 as well as from the hood 23 and introduces it from the plenum 30 peripherally into the bed 13 through the louvers 38 between the upper flared section 18 and the lower main funnel section 19 as well as interiorly of the bed through hopper air outlets 39 fed by air ducts 43. The ducts 43 are supplied with air by having connecting openings to the plenum in opposite sidewalls of the flared sections 18. The louvers 38 are sufficiently small to prevent overflow of material passing from one section 18 into the lower section 19, but are sufficiently large to allow air to be injected into the particles for passage both upwardly through the bed as well as downwardly through the lower funnel and connected standpipe portions of the hoppers.

The cross-sectional areas and flared sections 18 and 19 are proportioned to locate the inlet louver 38 in the intermediate region of the downward path of flow of the material such that adequate time and contact of the air with the material occurs above the air admission level to efficiently cool the material. Additionally, sufficient cross section of the flowing mass of particles is established to permit the air to flow upwardly from the fan with the pressure drop compatible with pressure available from the fan and of sufficient quantity to adequately meet combustion requirements. The downward path below the louvers 38 through the main funnel sections 19 and standpipes 20 is made of length and cross section sufficient to limit the quantity of air escaping from the discharge.

The downwardly moving air introduced to the hoppers at the louvers 38 and ports 39 passes through the standpipes 20 and is released at the discharge end of the pipes extending into the hood 23. As indicated above, this air tends to blow dust particles into the atmosphere surrounding the discharge end of the standpipes 20 which the hood 23 acts to contain. A negative pressure condition is established in the hood by suction of the fan connected by conduit 34 to the air inlet conduit 33 to which air is drawn from the atmosphere by the fan 31 through the metering orifice entrance 41. The fan thus effects removal of dust particles from the vicinity of the discharge ends of the hopper assuring that the work space surrounding the discharge ends of the hopper is free of dust particles and safe for personnel in the vicinity to operate the equipment.

Since the hood 23 surrounding the bottom of the standpipes 20 is connected directly to the air inlet duct 33 of the main fan 31, a negative pressure or suction is established in the discharge zone sufficient to remove all dust from the discharge region of the standpipe. Thus the fan in effect forms an air lock of negative pressure having varying dust removal and air volume capabilities balanced inherently with the pressure requirements dictated by kiln production and corresponding combustion air requirements. That is, the characteristics of the arrangement are such that with higher kiln production the greater air requirements of both the combustion process and the cooler are effected in unison. With such increased airflow, however, a greater blowing pressure results with consequent greater blowout of air and dust from the lime discharge pipes. With the increased air blowout, the greater is the suction on the hood 23 surrounding the discharge zone, because of the corresponding increase of suction in duct 33 and at orifice 41, thereby providing an inherent balance between the increased tendency toward blowout of air and dust particles and the suction which will withdraw the air and dust particles from the discharge zone. By reason of the dust particles being picked up by the large fan from the hood 23, many of the difficulties previously encountered with small fans for such purpose are eliminated. Small fans in such use experienced considerable wear by reason of erosion when dust particles passed over the fan blades and other parts of the fan. By use of the single large fan as herein described, the effect of particle wear is caused to be relatively insignificant and only a small fraction of the wear previously encountered, resulting in a corresponding considerable reduction in maintenance and power costs. Actually the entire airflow capacity of the main cooler fan can be utilized for dust suppression and recirculation of substantial quantities of air from the downpipes 20. In so doing a substantial secondary cooling effect is provided which promotes a greater uniformity of cooling of particles throughout the entire mass than can otherwise be obtained with the less than perfect balance of upward flow of air and lime in the main body of the cooler. In other words, by utilization of a single large fan, a larger quantity of air can be provided in the recirculation path in the lower region of the cooler than has heretofore been effected. With larger quantities of air in this region a much greater uniformity of cooling of all particles of the mass is promoted. A final stage of cooling of the particles of the cooler is thus effectively established with adequate capacity for airflow to assure a uniformity of cooling to a degree heretofore not obtained.

Still further, by utilization of the damper 35 in the duct 34, a regulation of the amount of flow of air and dust from the hood 23 into the inlet duct 33 of the main fan is established, and correspondingly the amount of air introduced into the inlet conduit 33 from the atmosphere through orifice 41 is regulated. Thus, a control is provided for the amount of recirculation air utilized and the amount of outside air introduced into the plenum 30 by the main fan.

A feature thus results in that the main fan's capability of drawing a larger quantity of air through the standpipes 20, made to a much larger size than heretofore, by way of the duct 34, permits a secondary or final cooling of the lime that would not be possible in previous systems because of inherent limitations of fan size and duct system and adequate residence time may now be provided for the transfer of this last remaining heat in the lime to the downflowing air. In other words, this secondary cooling effect, has never before been effectively achieved or its possibility recognized because of the small airflow capacity of auxiliary systems previously used, which precluded the use of any but the smallest cross section downpipes with inadequate time for cooling, since a larger section would require the handling of air quantities in excess of the fan and duct capabilities.

In view of the foregoing, while the invention has been described in considerable detail with regard to the illustrated embodiment, it will be understood that my invention is not limited specifically to the particular arrangement shown and described and accordingly by the appended claims all adaptions, modifications, and arrangements thereof are contemplated which fall within the true spirit and scope of the invention.

I claim:

1. Apparatus for cooling hot particles comprising means containing a bed of said particles, means supplying heated particles to the upper region of said bed, means for withdrawing cooled particles from the lower region of said bed, positive pressure means introducing air under pressure into said bed in a region intermediate the upper and lower regions of said contained bed establishing an upward and downward flow of air through said bed, said positive pressure means having air intake means from the atmosphere, air conveying means connecting said lower region of said bed to said air intake means for withdrawal and recirculation through said pressure means of air and removal of coincident dust particles evolved from said lower region of the bed for reintroduction to said intermediate region.

2. Particle cooling apparatus according to claim 1 wherein said means supplying heated particles includes combustion heating means to which the cooling air flowing upwardly through said bed is supplied as preheated air for the support of combustion heating of particles by said heating means.

3. Particle cooling apparatus according to claim 2 including airflow control means associated with said positive pressure means to establish airflow upwardly matched in quantity to combustion requirements of said heating means.

4. Particle cooling apparatus according to claim 3 wherein the means connecting the lower region of said bed to said air intake means includes regulating means assuring withdrawal of air sufficient to convey substantially all dust particles evolved in the lower region of said bed.

5. Apparatus for cooling particles comprising means containing a mass of said particles, means supplying heated particles to the top of said mass, means for withdrawing cooled particles from a bottom discharge region of said vertical mass, whereby said particles move progressively downward to said discharge region of the mass, an air blower connected to introduce air under pressure into said mass in a region intermediate the top and discharge region of said mass to establish a counterflow upward movement of cooling air through the upper region of said mass as well as a downward movement of cooling air through the lower region of said mass to said discharge region, said air blower having an atmospheric air intake, means connecting the discharge region of said bed to the air intake of said blower to establish a circulating air circuit through said lower region providing a final cooling stage in said mass and removing coincidentally evolved dust particles at said discharge region whereby the air and dust removal from said discharge region is automatically varied in balanced relation with changes in upward airflow requirements through the upper region of said mass.

6. The apparatus for cooling particles according to claim 5 wherein control means is provided for control of airflow through said circulation circuit.

7. Apparatus for cooling refractory particles comprising means defining a cooling zone, means feeding particles into said cooling zone, a hopper disposed below said cooling zone for receipt of particles from said zone, a standpipe receiving the discharge from said hopper, a hood enclosing the discharge end of said standpipe, said hopper having a louver opening between its upper inlet and lower outlet, a plenum enclosing at least the louver opening of said hopper, and an air blower having a positive pressure outlet connected to said plenum to introduce and blow cooling air through said louver opening to establish a substantially constant upward flow of cooling air through said particles in the regions above said louver as well as a downward flow of cooling air through particles in said hopper and standpipe below said louver opening, said blower having a negative pressure intake region to draw air from the atmosphere and connected to said discharge hood to withdraw therefrom the air moving downward through the particles in said hopper and standpipe as well as free dust particles discharged thereto.

8. Apparatus according to claim 7 including means for controlling the amount of discharged air withdrawn from said hood by said blower, whereby the amount of air recirculated through the lower region of said hopper will govern within a limited range the air drawn by the fan from the atmosphere.

9. Apparatus according to claim 7 wherein cooling air outlet means is also provided interiorly of the mass of particles in the hopper and air conveying means is provided connecting said interior outlet means with said plenum.

10. Apparatus for cooling refractory particles comprising means defining a cooling zone, means feeding particles to said cooling zone, a plurality of side-by-side hoppers disposed below said cooling zone for receipt of particles from said zone each of said hoppers having a standpipe receiving the discharge from its respective hopper, a hood enclosing the discharge ends of said standpipes, each said hopper having a louver opening between its upper inlet and lower outlet, a plenum enclosing the louver openings of all said hoppers, an air blower having a positive pressure outlet connected to said plenum to introduce and blow cooling air through said enclosed louver openings to establish an upward flow of cooling air through the particles in the hopper regions above said louvers as well as downward flow of cooling air through particles in the hopper regions and standpipes below said louver openings, said blower having a negative pressure intake region connected to the atmosphere and to said discharge hood to draw both atmospheric air and the downward flowing air discharged from said standpipes along with coincident dust particles evolved therefrom.

11. Particle cooling apparatus according to claim 10 wherein in addition cooling air outlets are located in each hopper to supply air interiorly of the mass of particles through said hoppers.

12. Particle cooling apparatus according to claim 11 wherein air is supplied to said additional air outlets by way of air conveying means connected to said plenum.

13. Particle cooling apparatus according to claim 10 including means supplying heated particles comprising combustion heating means to which the cooling air flowing upwardly through the hoppers is supplied for support of combustion occurring at said heating means.

14. Particle cooling apparatus according to claim 13 including airflow control means to establish airflow upwardly matched in quantity to combustion requirements of said heating means.

15. A method of cooling hot particles of a downwardly flowing mass of said particles in a bed comprising drawing a quantity of cooling air including air from the atmosphere at a given rate into a path for introduction into said bed, introducing said cooling air into said bed intermediate the upper and lower regions of said bed for flow of a portion of said cooling air upward and another portion downward through said bed, establishing a negative pressure zone in the bottom region of said bed to withdraw said downwardly moving air and coincident dust particles, and reintroducing said downwardly moving air with said dust particles to the cooling air drawn into said air path introduced to said bed.

16. The method of claim 15 wherein the air with said dust particles reintroduced to said air path is regulated in quantity and the air drawn from the atmosphere, within a limited range, is correspondingly regulated in inverse quantity relation.